(12) United States Patent
DiCarlo

(10) Patent No.: US 6,856,446 B2
(45) Date of Patent: Feb. 15, 2005

(54) DIGITAL MICROMIRROR DEVICE HAVING MIRROR-ATTACHED SPRING TIPS

(75) Inventor: Anthony DiCarlo, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/317,474

(22) Filed: Dec. 12, 2002

(65) Prior Publication Data

US 2003/0117686 A1 Jun. 26, 2003

Related U.S. Application Data

(60) Provisional application No. 60/339,759, filed on Dec. 12, 2001.

(51) Int. Cl.[7] .......................... G02B 26/00; G02B 26/08
(52) U.S. Cl. ...................... 359/291; 359/290; 359/223; 359/224
(58) Field of Search .............................. 359/290, 291, 359/224, 298; 345/108; 347/239

(56) References Cited

U.S. PATENT DOCUMENTS

| 5,583,688 | A | | 12/1996 | Hornbeck | |
|---|---|---|---|---|---|
| 5,867,202 | A | | 2/1999 | Knipe et al. | |
| 6,028,690 | A | | 2/2000 | Carter et al. | |
| 6,781,094 | B2 | * | 8/2004 | Harper | 219/121.72 |
| 2003/0095318 | A1 | * | 5/2003 | DiCarlo et al. | 359/291 |
| 2004/0125347 | A1 | * | 7/2004 | Patel et al. | 353/98 |
| 2004/0136044 | A1 | * | 7/2004 | Miller et al. | 359/223 |
| 2004/0164980 | A1 | * | 8/2004 | Hewlett | 345/418 |
| 2004/0165250 | A1 | * | 8/2004 | Aubuchon | 359/292 |
| 2004/0184132 | A1 | * | 9/2004 | Novotny et al. | 359/290 |

OTHER PUBLICATIONS

U.S. Appl. No. 10/298,423, filed Nov. 18, 2002, DiCarlo et al.

* cited by examiner

*Primary Examiner*—Ricky Mack
(74) *Attorney, Agent, or Firm*—Charles A. Brill; Wade James Brady, III; Frederick J. Telecky, Jr.

(57) ABSTRACT

A micromirror array 110 fabricated on a semiconductor substrate 11. The array 110 is comprised of three operating layers 12, 13, 14. An addressing layer 12 is fabricated on the substrate. A hinge layer 13 is spaced above the addressing layer 12 by an air gap. A mirror layer 14 is spaced over the hinge layer 13 by a second air gap. The hinge layer 13 has a hinge 13a under and attached to the mirror 14a, the hinge 13a permitting the mirror 14a to tilt. Spring tips 13c under the mirror 14a are attached to the underside of the mirror 14a. These spring tips 13c tilt with the mirror 14a and provide a landing point for the mirror 14a onto a surface of the underlying pixel element structure.

17 Claims, 5 Drawing Sheets

DIGITAL MICROMIRROR DEVICE HAVING MIRROR-ATTACHED SPRING TIPS

This application claims priority under 35 USC §119(e)(1) of provisional application number 60/339,759 filed Dec. 12, 2001.

RELATED APPLICATION

This application is related to co-pending application Ser. No. 10/298,423, filed Nov. 21, 2001 entitled "Yokeless Hidden Hinge Digital Micromirror Device".

TECHNICAL FIELD OF THE INVENTION

This invention relates to micro-electromechanical devices and their fabrication, and more particularly to a digital micromirror device having an improved design.

BACKGROUND OF THE INVENTION

A Digital Micromirror Device™ (DMD™) is a type of microelectromechanical systems (MEMS) device. Invented in 1987 at Texas Instruments Incorporated, the DMD is a fast, reflective digital light switch. It can be combined with image processing, memory, a light source, and optics to form a digital light processing system capable of projecting large, bright, high-contrast color images.

The DMD is fabricated using CMOS-like processes over a CMOS memory. It has an array of individually addressable mirror elements, each having an aluminum mirror that can reflect light in one of two directions depending on the state of an underlying memory cell. With the memory cell in a first state, the mirror rotates to +10 degrees. With the memory cell in a second state, the mirror rotates to −10 degrees. By combining the DMD with a suitable light source and projection optics, the mirror reflects incident light either into or out of the pupil of the projection lens. Thus, the first state of the mirror appears bright and the second state of the mirror appears dark. Gray scale is achieved by binary pulsewidth modulation of the incident light. Color is achieved by using color filters, either stationary or rotating, in combination with one, two, or three DMD chips.

DMD's may have a variety of designs, and the most popular design in current use is a structure consisting of a mirror that is rigidly connected to an underlying yoke. The yoke in turn is connected by two thin, mechanically compliant torsion hinges to support posts that are attached to the underlying substrate. Electrostatic fields developed between the underlying memory cell and the yoke and mirror cause rotation in the positive or negative rotation direction.

The fabrication of the above-described DMD superstructure begins with a completed CMOS memory circuit. Through the use of six photomask layers, the superstructure is formed with alternating layers of aluminum for the address electrode, hinge, yoke, and mirror layers and hardened photoresist for sacrificial layers that form air gaps.

SUMMARY OF THE INVENTION

One aspect of the invention is an array of digital micromirror pixel elements. The array has a structure defined by three layers spaced from each other with an air gap between each layer. A mirror layer has a reflective mirror associated with each pixel element. A hinge layer is spaced under the mirror layer, and has a torsion hinge under each mirror and attached to the mirror such that the mirror may tilt above the hinge layer. An address layer is spaced under the hinge layer, and has circuitry for controlling operation of the pixel elements. The hinge layer further has spring tips under each mirror, with the spring tips being mechanically connected to the bottom of the mirror layer. The spring tips are cantilevered from the bottom of the mirror in a manner that permits them to land and flex when the mirror tilts.

As stated in the Background, conventional DMD designs have spring tips that are attached to the structure underlying the mirror rather than to the mirror. These prior spring tips are stationary. In the present invention, the spring tips provide landing structures that move with the mirror.

As compared to DMD designs in which spring tips were attached to mid-level yokes placed above the hinge layer, the present invention provides a much simpler design. As compared to other DMD designs that eliminate the yoke and use spring tips at the hinge layer, an advantage of the present invention is that it supports low voltage drive operation. The placement of the spring tips out at the end of the mirror corners provides better tilt stability and reset torquing impulse. In addition, the ability of the spring tips to pass through a void in the addressing layer provides reliable operation at lower voltages as compared to previous designs.

The pixel elements can be made more compact, as compared to previous DMD designs, by requiring less space between the mirror and the underlying addressing layer. This, in addition to a larger electrode area on the hinge layer, permits the pixel to be driven by lower voltages. The spring tip further provides a solenoid effect, which helps latching during operation.

DETAILED DESCRIPTION OF THE INVENTION

The following discussion is directed to a DMD design in which the mirror elements have spring tips that are attached to the bottom of the mirror. Thus, the spring tips move with the mirror. A different design, in which the spring tips are attached to the structure underlying the mirror rather than to the mirror, and are stationary, is discussed in co-pending U.S. patent application Ser. No. 10/298,423, entitled "Yokeless Hidden Hinge Digital Micromirror Device", incorporated herein by reference.

DMD Pixel Elements with Mirror-Attached Spring Tips

Figure 1:
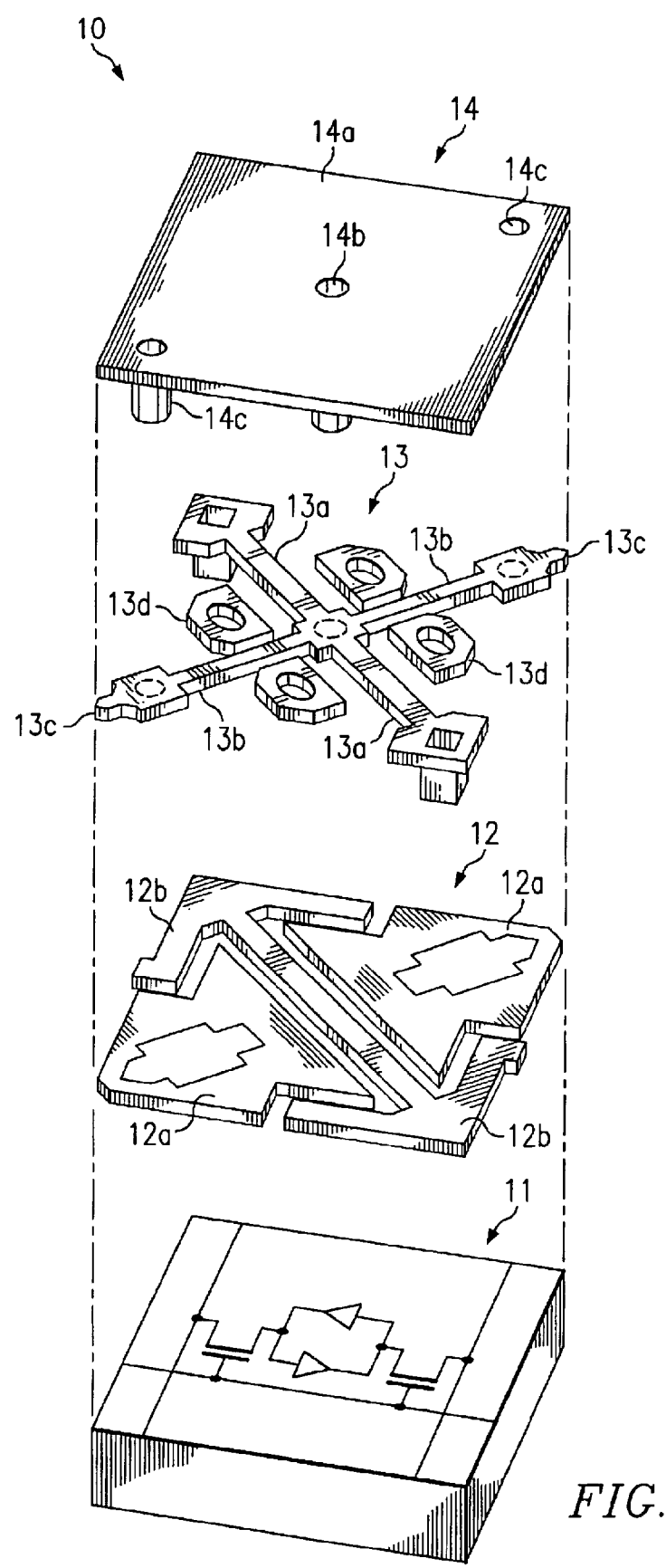
FIG. 1 is an exploded view of a DMD pixel element in accordance with the invention.

FIG. 1 is an exploded view of a DMD pixel element 10 in accordance with the invention. This pixel element 10 is one of an array of such elements fabricated on a wafer, using semiconductor fabrication techniques.

DMD pixel element 10 is a monolithically integrated MEMS superstructure cell fabricated over a CMOS SRAM cell 11. Two sacrificial layers (see FIGS. 2 and 10) have been removed by plasma etching to produce air gaps between three metal layers of the superstructure. For purposes of this description, the three metal layers are "spaced" apart by being separated by these air gaps.

The uppermost metal layer 14 has a reflective mirror 14*a*. The air gap under the mirror 14*a* frees the mirror 14*a* to rotate about a compliant torsion hinge 13*a*, which is part of the second (middle) metal layer 13. A third metal (M3) layer 12 has address electrodes 12*a* for the mirror 14*a*, the address electrodes 12*a* being connected to SRAM cell 11. The M3 layer 12 further has a bias bus 12*b*, which interconnects the mirrors 14*a* of all pixels to a bond pad at the chip perimeter. An off-chip driver supplies the bias waveform necessary for proper digital operation.

The DMD mirrors 14*a* are each 16 um square and made of aluminum for maximum reflectivity. They are arrayed on 17 um centers to form a matrix having a high fill factor (~90%). The high fill factor produces high efficiency for light use at the pixel level and a seamless (pixelation-free) projected image. The hinge layer 13 under the mirrors 14*a* permits a close spacing of the mirrors 14, and because of the underlying placement of the hinges, an array of pixel elements 10 is referred to as a "hidden hinge" type DMD architecture.

In operation, electrostatic fields are developed between the mirror 14*a* and its address electrodes 12*a*, creating an electrostatic torque. This torque works against the restoring torque of the hinge 13*a* to produce mirror rotation in a positive or negative direction. At their bottom surfaces, the two tilting corners of mirror 14*a* are each attached to a spring tip 13*c*, by means of a spring tip support. The mirror rotates until the spring tip 13*c* under the downward tilting corner comes to rest (or lands) on the silicon dioxide that covers the CMOS surface and supports the addressing (M3) layer 12.

Figure 2:
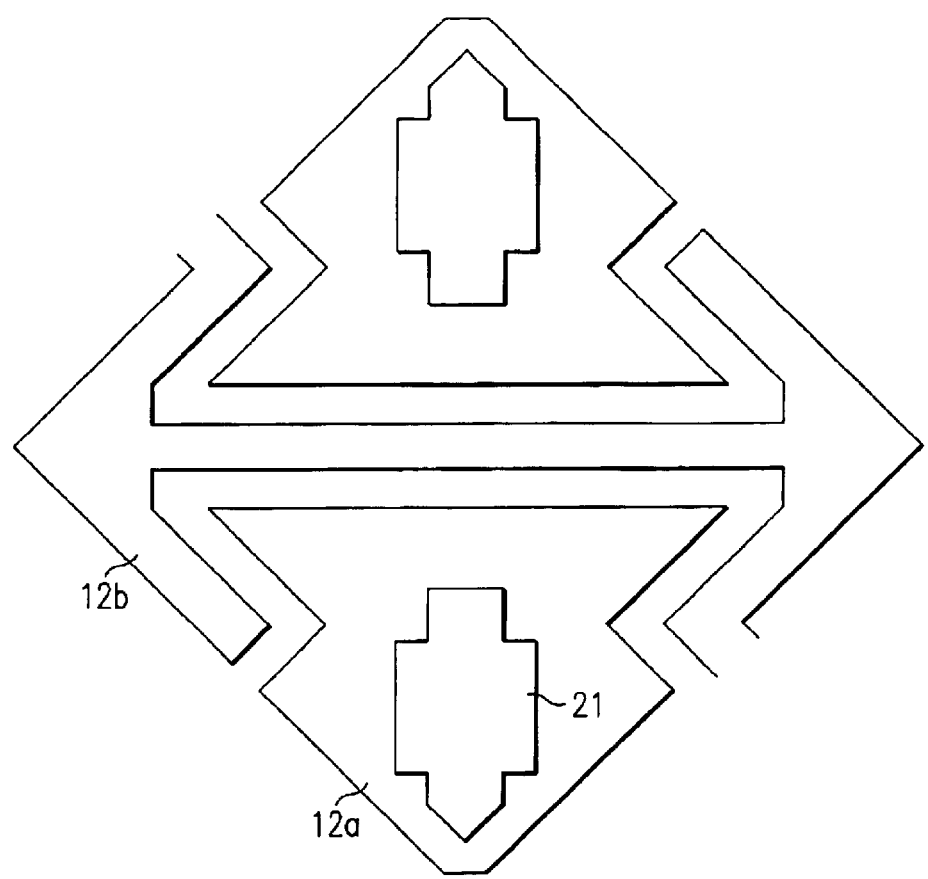
FIG. 2 is a top plan view of the M3 layer of FIG. 1.

FIG. 2 illustrates the surface of the addressing (M3) layer 12. A void region 21 of the address electrode 12*a* is cut out. This cut-out region permits the spring tips 13*c* to pass through the addressing layer 13 and land on the silicon dioxide over the CMOS 11 on rotational transition (touchdown). This further permits pixel element 10 to be more compact, as compared to previous DMD designs. Permitting the spring tip 13*c* to enter this region 21 has the effect of an electrostatic solenoid, "trapping" the tip structure of mirror element 10 below the plane of the addressing layer 13.

An optional metal pad placed on the CMOS surface directly below each spring tip 13*c* can supply attractive torque to add to locking the mirror element 10 in place. This pad could be held at the same potential as the spring tips 13*c* (and the mirror 14). The result is a capacitor comprised of the spring tip 13*c*, the silicon dioxide, and the pad.

FIGS. 3–10 illustrate the DMD fabrication process. As explained below, other than patterning, this process follows conventional DMD fabrication up through deposition of a first spacer layer, S1.

Figure 3:
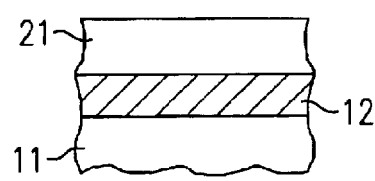
FIG. 3 is a cross sectional view of the layers of a DMD wafer through deposition and etching of a first spacer layer.

FIG. 3 is a cross sectional view of the layers of a DMD wafer through the deposition of the first spacer (S1) layer 21. The fabrication of the DMD superstructure begins with a completed CMOS memory circuit 11. Circuit 11 may be a conventional 5T or 6T SRAM cell. A thick oxide is deposited over the CMOS surface and then planarized, such as by using a chemical mechanical polish (CMP) technique. The CMP step provides a completely flat substrate for DMD superstructure fabrication.

Through the use of photomasking techniques, the M3 layer 12 is formed above the CMOS 11. This M3 layer 12 is formed with aluminum for address and bus circuitry. The aluminum is sputter-deposited and plasma-etched using plasma-deposited SiO2 as the etch mask. Other than the formation of void 21, M3 layer 12 may be etched in a pattern similar to that used for DMD structures previously described in U.S. Pat. No. 6,028,690, entitled "Reduced Micromirror Gaps for Improved Contrast Ratio, and in U.S. Pat. No. 5,583,688, entitled "Multilevel Digital Micromirror Device", both assigned to Texas Instruments Incorporated. These patents are incorporated by reference herein.

To reduce undesired light scattering, an optional antireflective TiN (titanium nitride) layer and an oxide layer may be placed over the addressing (M3) layer 12. These layers are patterned and etched to provide the appropriate open pads and vias onto the addressing layer 12.

A spacer layer 21, identified as S1, is then deposited over the M3 layer 11. Spacer layer 21 may be formed from hardened photoresist. Later in the packaging flow, this spacer layer 21 is plasma-ashed to form an air gap. A typical thickness for spacer layer 21 is 9400 angstroms.

A number of vias are then formed in spacer layer 21, formed by conventional pattern and etching techniques. These vias are evident in FIG. 7, discussed below, which illustrates the surface of the hinge layer 13 and its vias into S1. As explained below, the vias are lined or filled during deposition of subsequent layers to support various structures at the hinge layer level.

Figure 4:
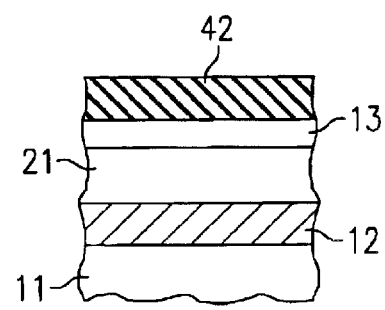
FIG. 4 is a cross sectional view of the layers of a DMD wafer through deposition of a hinge metal layer and oxide layer.
Figure 5:
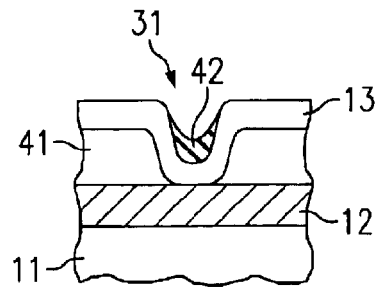
FIG. 5 is a cross sectional view of the layers of a DMD wafer through deposition and etching of a first spacer layer.
Figure 6:
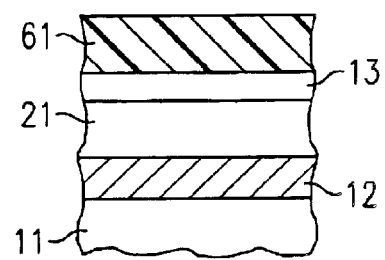
FIG. 6 is a cross sectional view of the layers of a DMD wafer through deposition of a hinge patterning layer.

FIGS. 4–6 illustrate fabrication of hinge layer 13 As explained below, hinge layer 13 contains hinge 13*a*, two spring tip beams 13*b*, a spring tip 13*c* extending from the outer end of each spring tip beam 13*b*, and raised address electrodes 13*d*.

Referring to FIG. 4, the hinge layer 13 is formed by deposition of the hinge metal layer 13 and an oxide layer 42. The hinge metal is typically an aluminum alloy, such as AlTiO. An example of a suitable thickness for hinge layer 13 is 600 angstroms. An example of a suitable thickness for oxide layer 42 is 5000 angstroms.

FIG. 5 illustrates a portion of the partially fabricated DMD having a via 31 and the result of a patterned etch process. The etch leaves an oxide coating 42 within the via 31. The oxide at the bottom of the vias covers the thin metal at the bottom of each via, thereby providing strengthening. A develop rinse is then performed, or other cleanup to remove residue and prevent surface contamination. As an alternative to a patterned etch, a blanket etch could be used, which would tend to leave the oxide on the via side walls. As an alternative to oxide layer 42, a metal material rather than oxide could be deposited.

FIG. 6 illustrates the deposition and patterning of a hinge patterning layer 61. The patterning layer 61 is etched with a hinge etch mask in the pattern illustrated in FIG. 1. Then patterning layer 61 is chemically removed. The patterned hinge layer 13 is then descumed.

Figure 7:
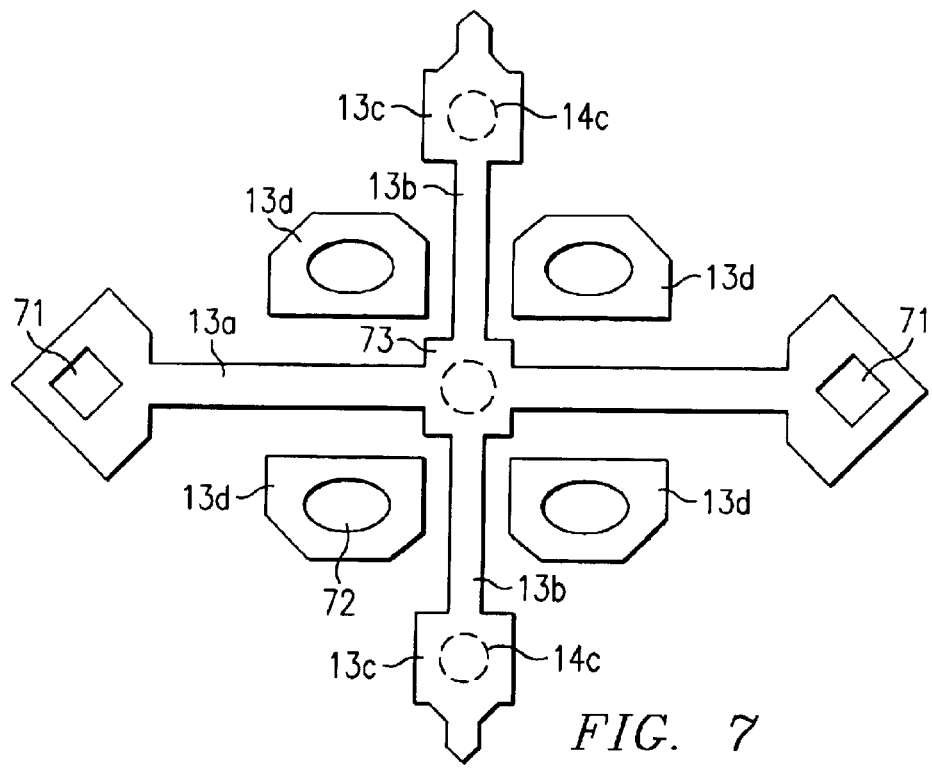
FIG. 7 is a perspective view of the surface of the hinge layer after patterning.

FIG. 7 is a perspective view of the surface of the patterned hinge layer 13. The various vias into S1 are shown, as well as a hinge pad 73, upon which the mirror via 14a will end. Referring again to FIG. 1, the vias, now filled with deposited oxide material, form support posts after the spacer layer 21 is removed. These vias support the hinge 13a and address electrodes 13d, respectively, and are identified as hinge support vias 71 and address electrode support vias 72.

Two spring tips 13c are located under each of the two tilting corners of mirror 14a. As indicated by the dotted lines, as a result of subsequent fabrication steps, spring tip connection vias 14c will connect the spring tips 13c to the bottom of the mirror 14a.

In the embodiment of FIG. 7, the hinge 13a and spring tips 13b form a cross-shaped pattern with the two spring tip beams 13b extending at right angles from the center of hinge 13a. In other embodiments, it would be possible to eliminate the spring tip beams 13b, such that, in the completed pixel element after all spacer layers are removed, the entire spring tip structure comprises only two spring tips 13c extending from the bottom of the mirror 14a.

Figure 8:
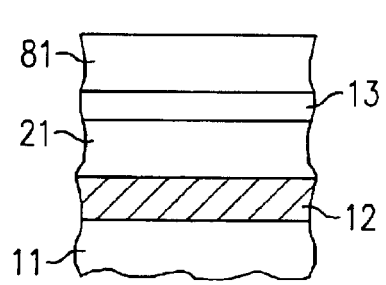
FIG. 8 is a cross sectional view of the layers of a DMD wafer through deposition of a second spacer layer.

FIG. 8 illustrates the deposition of second spacer (S2) layer 81. A typical thickness for spacer layer 81 is 9400 angstroms. A mirror via, as well as spring tip connection vias, are patterned and etched. These vias are illustrated in FIG. 1 as support posts 14b and 14c, respectively, formed when the vias are filled as described below in connection with FIG. 10. The spacer resist is then cured and the surface descumed. A feature of the invention is that the gap between the mirror layer 14 and the hinge layer 13 can be reduced, as compared to conventional DMD designs. This reduces reflection off the hinge level in the gap, resulting in better image quality.

Figure 9:
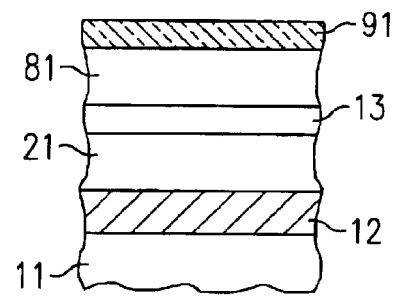
FIG. 9 is a cross sectional view of the layers of a DMD wafer through deposition of a mirror metal layer.

FIG. 9 illustrates deposition of metal mirror layer 91, from which mirror 14a is patterned. A typical thickness for mirror layer 91 is 3350 angstroms. The metal for mirror layer 91 is typically aluminum or an alloy of aluminum.

Figure 10:
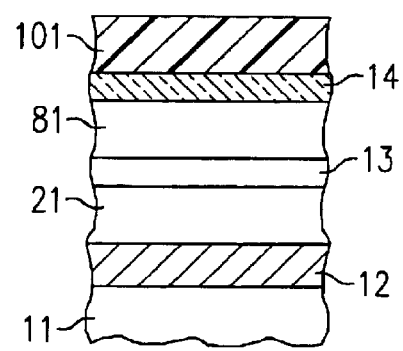
FIG. 10 is a cross sectional view of the layers of a DMD wafer through deposition of a mirror patterning layer.

FIG. 10 illustrates deposition of a mirror patterning layer 101, which is used to pattern mirror 14a. Mirror layer 14 is patterned and etched, leaving the mirror 14 of FIG. 1, and filling the vias to form the mirror support post 14b and spring tip support posts 14c.

Figure 11:
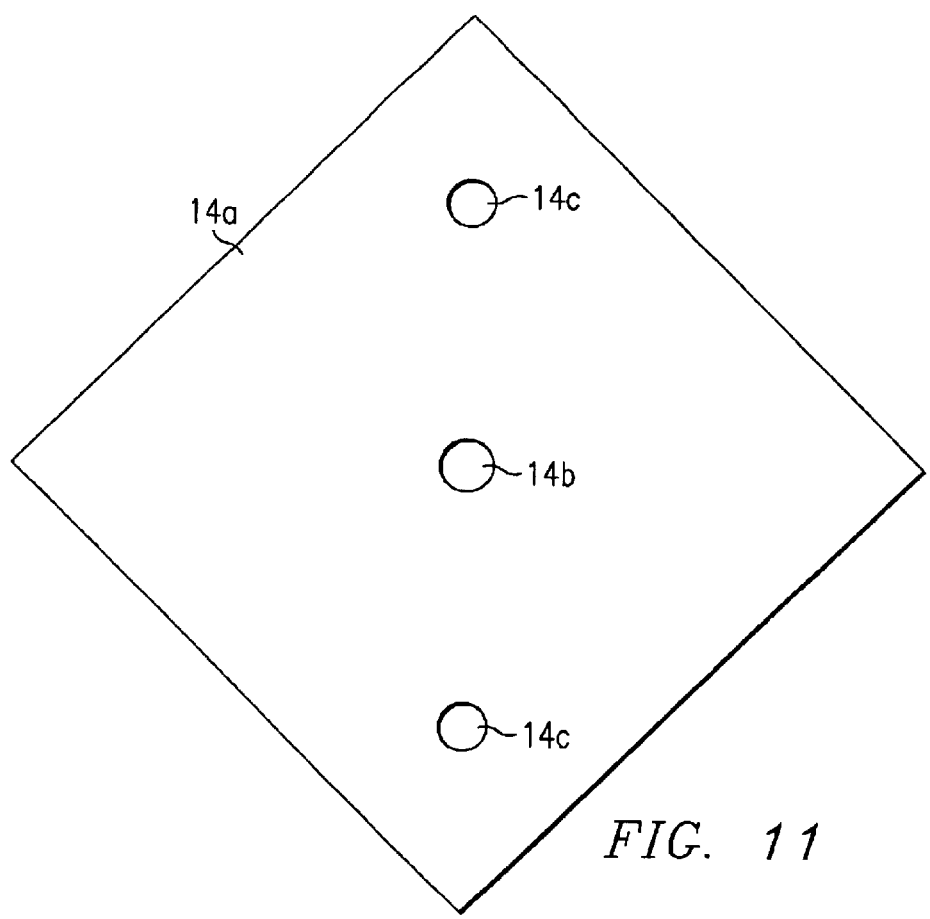
FIG. 11 is a top plan view of the mirror layer.

FIG. 11 is a top plan view of mirror 14, after patterning and etching. If desired, an additional fabrication step may be used to further fill vias 14b and 14c and thereby improve the reflectivity of mirror 14a.

The packaging flow begins with the wafers partially sawed along the chip scribe lines to a depth that will allow the chips to be easily broken apart later. Before separating the chips from one another, each chip is tested for full electrical and optical functionality by a high-speed automated wafer tester. The chips are then separated from the wafer, and proceed to a plasma etcher that is used to selectively strip the organic sacrificial layers, S1 and S2, from under the mirror layer 14 and hinge layer 13. The chips are then plasma-cleaned, relubricated, and hermetically sealed in a package.

Figure 12:
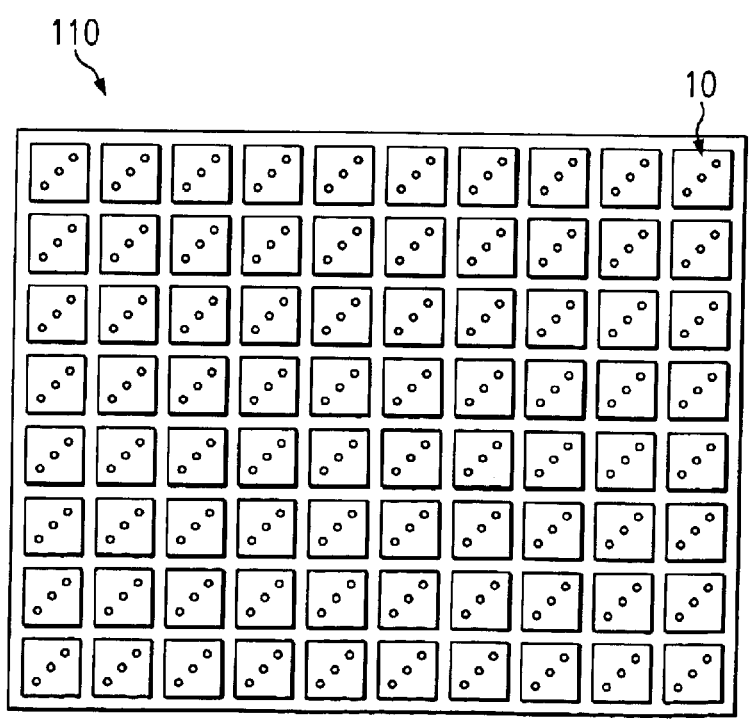
FIG. 12 is a top plan view of an array of mirror elements.

FIG. 12 is a top view of an array 120 of mirror elements 10. DMD arrays often have more than a thousand rows and columns of pixel elements 10. Packaged DMD chips are commercially available in various array sizes. For example, SVGA (800×600) and SXGA (1280×1024) arrays have been made. The diagonals of the active area are 0.7 inches and 1.1 inches, respectively.

In operation, the attachment of the spring tips 13c to the underside of the mirror has distinct advantages as compared to previous DMD designs that have stationary spring tips attached to the structure underlying the mirror. The mirror-attached design frees up electrode surface space at the hinge level 13.

Additionally, the mirror element 10 may be driven by lower voltage, and a solenoid type lock prevents upset that could otherwise occur when a pixel element is reset. Prior DMD designs have used a 7.5 volts to increase the electric potentials associated with "stay" and "crossover" transitions. The design of the present invention does not require such large voltages to separate these states due to the advantage of using the CMOS level 10 as a "lock-in" dielectric capacitor, as well as the electrostatic solenoid effect of the spring tip 13c falling below the M3 layer 13 during transition.

Figure 13:
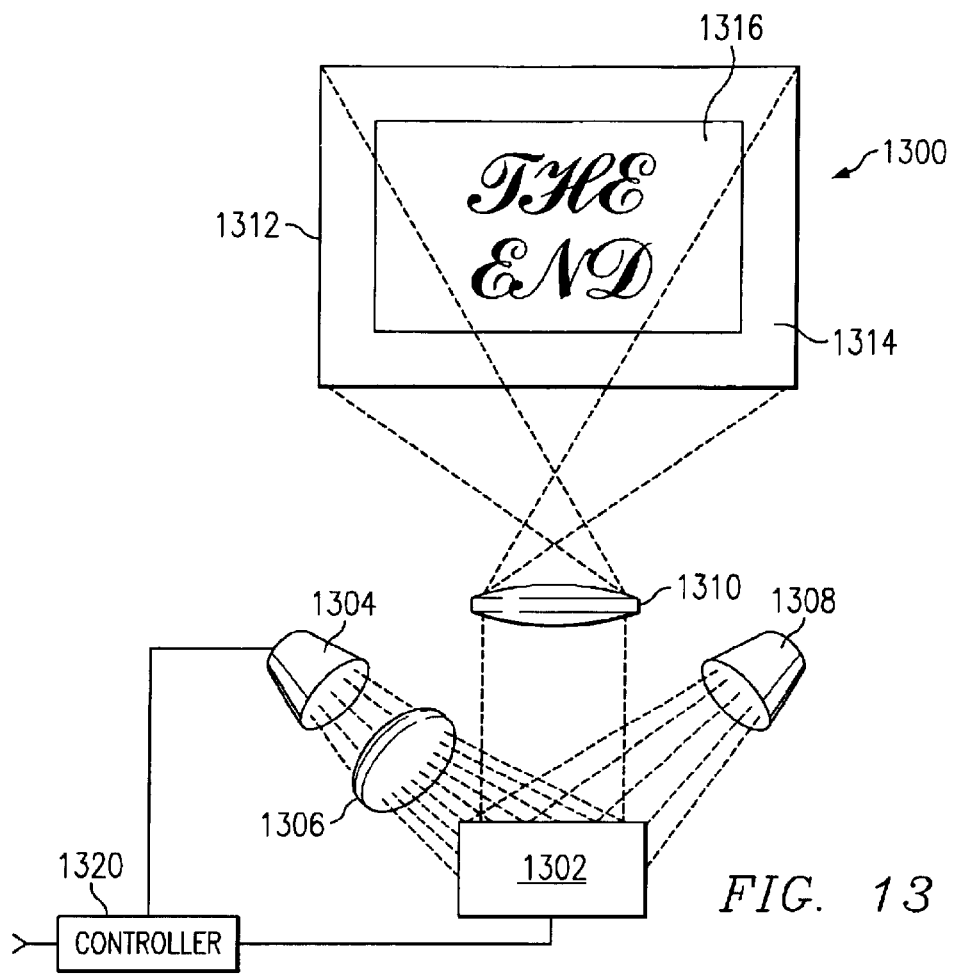
FIG. 13 is a schematic representation of a projection display system having a DMD array in accordance with the invention.

FIG. 13 is a schematic view of an image projection system 1300 having an improved micromirror device 1302 in accordance with the invention. Light from light source 1304 is focused on the micromirror device 1302 by lens 1306. Although shown as a single lens, lens 1306 is typically a group of lenses and mirrors which together focus and direct light from the light source 1304 onto the surface of the micromirror device 1302. Mirrors on the micromirror device that are rotated to an off position reflect light to a light trap 1308 while mirrors rotated to an on position reflect light to projection lens 1310, which is shown as a single lens for simplicity. Projection lens 1310 focuses the light modulated by the micromirror device 1302 onto an image plane or screen 1312. Mirrors in the exterior border region of micromirror device 1302 direct the light impinging on the border region to the light trap 1308, ensuring that the border region of the display 1314 is very dark and creating a sharp contrast with the interior image portion 1316 of the image plane. Controller 1320 provides timing and control signals for operating the pixel elements in the manner described above and in the referenced patents.

DMD Pixel Elements With Mirror-Attached and Hinge-Level-Attached Spring Tips

Figure 14:
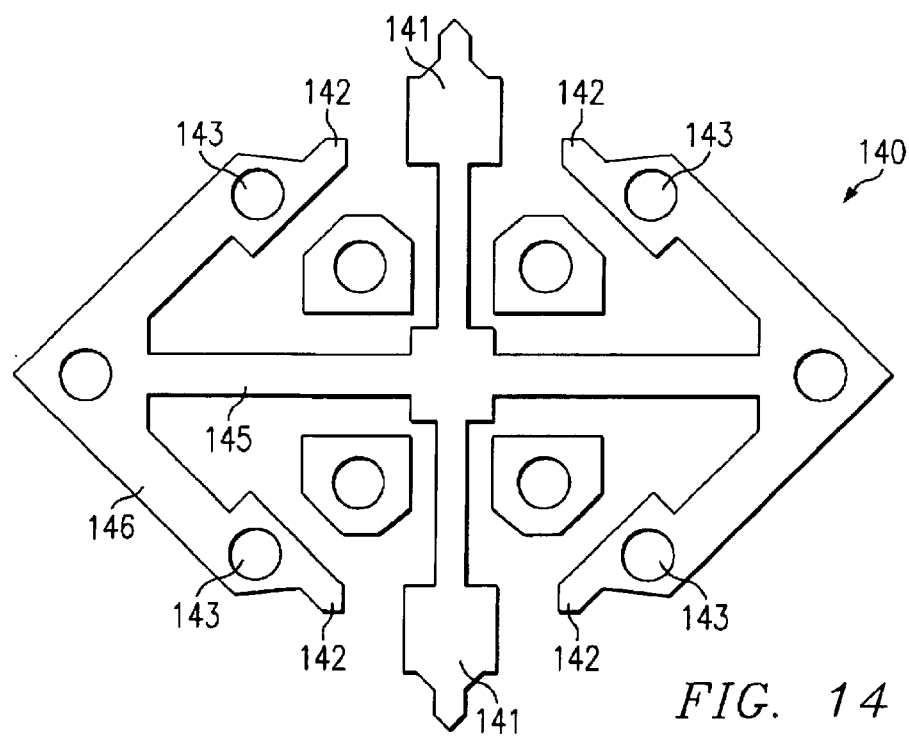
FIG. 14 is a perspective view of another embodiment of the hinge layer of FIG. 1.

FIG. 14 is a perspective view of another embodiment of the patterned hinge layer, identified as hinge layer 140. This hinge layer 140 may be used to replace the hinge layer 13 in the pixel element 10 of FIG. 1.

A feature of hinge layer 140 is that it has mirror-attached spring tips 141 as well as hinge-level-attached spring tips 142. Each mirror element 10 has a total of six spring tips.

The mirror-attached spring tips 414 are similar to those discussed above. The hinge-level-attached spring tips 142 are supported by spring tip vias 143 into the first spacer layer 21. Hinge support beams 146 extending at an inward angle from the ends of hinge 145 connect spring tips 142 to the hinge 145.

The fabrication of a pixel element having hinge layer 140 is the same as the fabrication of the above-described pixel element 10, except for the patterning of the hinge layer to form spring tips 142 and the formation of additional vias 143 into the first spacer layer 31. If desired, any or all of these vias 143 may be plugged with an oxide plug after fabrication of the hinge metal layer.

In operation, a tilting corner of mirror 14a lands on three points provided by two spring tips 142 and a spring tip 141. An advantage of the design of FIG. 14 is that it avoids electrostatically induced hinge sag. The spring tips 143 contact the backside of mirror 14a on touchdown, and eliminate electrostatically induced vertical force on mirror 14a on hinge 145. Hinge metal memory effects are also reduced. As a result, the hinge metal can be made thinner, as compared to other DMD designs.

Other Embodiments

Although the present invention has been described in detail, it should be understood that various changes, substitutions, and alterations can be made hereto without departing from the spirit and scope of the invention as defined by the appended claims.

What is claimed is:

1. An array of digital micro pixel elements, comprising:
    a mirror layer having a mirror associated with each pixel element;
    a hinge layer spaced under the mirror layer, the hinge layer having a torsion hinge under each mirror and attached to the mirror such that the mirror may tilt above the hinge layer; and
    an address layer spaced under the hinge layer, the address layer having circuitry for controlling operation of the pixel elements,
    wherein the hinge layer further has spring tips under each mirror and mechanically connected to and moveable with the mirror.

2. The array of claim 1, wherein the hinge layer has two spring tips.

3. The array of claim 1, wherein each mirror is rectangular in shape, wherein the hinge is under the diagonal axis of the mirror such that the mirror tilts around the diagonal axis, and the spring tips are located under the tilting corners of the mirror.

4. The array of claim 1, wherein the spring tips and the hinge are fabricated from the same material.

5. The array of claim 1, wherein the spring tips are fabricated from a metallic material.

6. The array of claim 1, wherein the spring tips extend from at least one spring tip beam that is connected to the address layer with one or more spring tip support vias.

7. The array of claim 6, wherein the hinge and the spring tip beams form a continuous pattern of the hinge layer.

8. The array of claim 6, wherein the address layer has a void region under each of the spring tips.

9. A micro pixel array, comprising
    a substrate having electrical components fabricated on the surface of the substrate;
    an array of pixel elements, each element comprising a mirror, a hinge under the mirror spaced under the mirror by an air gap and mechanically connected to the mirror such that the minor may tilt above the hinge, an address layer spaced under the hinge and in electrical connection with the electrical components of the substrate, and spring tips mechanically connected to the underside of the mirror, such that the spring tips may move with the minor and provide landing points for the mirror.

10. The array of claim 9, wherein the hinge layer has two spring tips.

11. The array of claim 9, wherein each mirror is rectangular in shape, wherein the hinge is under the diagonal axis of the mirror such that the mirror tilts around the diagonal axis, and the spring tips are located under the tilting corners of the mirror.

12. The array of claim 9, wherein the spring tips and the hinge are fabricated from the same material.

13. The array of claim 9, wherein the spring tips are fabricated from a metallic material.

14. The array of claim 9, wherein the spring tips extend from at least one spring tip beam that is connected to the address layer with one or more spring tip support vias.

15. A display system, comprising:
    a light source for producing a light beam along a light path; and
    a micromirror device in the light path for selectively reflecting portions of the light beam along a second light path toward an image plane, the micromirror device comprising:
        a substrate having electrical components fabricated on the surface of the substrate;
        an array of mirror elements, each element comprising a reflective mirror, a hinge under the mirror spaced under the mirror by an air gap and mechanically connected to the mirror such that the mirror may tilt above the hinge, an address layer spaced under the hinge and in electrical connection with the electrical components of the substrate, and spring tips mechanically connected to the underside of the mirror such that the spring tips move with the mirror and provide a landing surface for the mirror.

16. The display system of claim 15, further comprising a projection lens in the second light path for receiving the selectively reflected light and focusing the selectively reflected light on the image plane.

17. The display system of claim 15, further comprising a controller for providing image data to the micromirror device.

* * * * *